(12) United States Patent
Lorenzon

(10) Patent No.: US 12,521,346 B2
(45) Date of Patent: Jan. 13, 2026

(54) GRANULAR PRODUCT BASED ON ARGININE

(71) Applicant: SILA S.R.L., Noale (IT)

(72) Inventor: Maurizio Lorenzon, Noale (IT)

(73) Assignee: SILA S.R.L., Noale (IT)

( * ) Notice: Subject to any disclaimer, the term of this patent is extended or adjusted under 35 U.S.C. 154(b) by 1031 days.

(21) Appl. No.: 17/604,615

(22) PCT Filed: Apr. 17, 2020

(86) PCT No.: PCT/IB2020/053666
§ 371 (c)(1),
(2) Date: Oct. 18, 2021

(87) PCT Pub. No.: WO2020/212935
PCT Pub. Date: Oct. 22, 2020

(65) Prior Publication Data
US 2022/0192983 A1 Jun. 23, 2022

(30) Foreign Application Priority Data
Apr. 19, 2019 (IT) ........................ 102019000006214

(51) Int. Cl.
*A61K 9/16* (2006.01)
*A61K 9/50* (2006.01)
*A61K 31/198* (2006.01)

(52) U.S. Cl.
CPC .......... *A61K 9/1617* (2013.01); *A61K 9/5015* (2013.01); *A61K 31/198* (2013.01)

(58) Field of Classification Search
CPC .. A61K 9/1617; A61K 9/5015; A61K 31/198; A23L 33/175
See application file for complete search history.

(56) References Cited

U.S. PATENT DOCUMENTS

2010/0150994 A1* 6/2010 Kotyla ................. A61K 8/0291
424/490
2019/0045825 A1 2/2019 Mukouyama et al.

FOREIGN PATENT DOCUMENTS

| CN | 108926717 A | 12/2018 | | |
|---|---|---|---|---|
| CN | 105434402 B | 3/2019 | | |
| EP | 3398591 A1 | 11/2018 | | |
| WO | WO-2017055997 A1 * | 4/2017 | ........... | A61K 31/198 |
| WO | WO-2017140902 A1 * | 8/2017 | ............. | A23L 33/12 |

* cited by examiner

*Primary Examiner* — Jessica Worsham
(74) *Attorney, Agent, or Firm* — Volpe Koenig

(57) ABSTRACT

A granular product based on arginine or the derivatives thereof, comprises an internal core in which there is substantially concentrated the arginine and a coating for covering and protecting the internal core, wherein the coating is formed by a lipidic matrix comprising a fraction by weight equal to or greater than 60% of glycerides of saturated fatty acids C16 and C18 and a fraction by weight of a mineral salt of alginate between 0.5% and 3%.

11 Claims, No Drawings

GRANULAR PRODUCT BASED ON ARGININE

TECHNICAL FIELD

The present invention relates to a granular product based on arginine or the derivatives thereof having the features set out in the preamble of the main claim.

TECHNOLOGICAL BACKGROUND

Arginine is an amino acid having the formula (I) set out below.

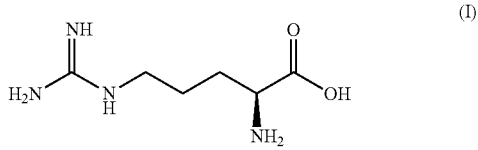 [SMILES: N=C(N)NCCC[C@H](N)C(=O)O]

The lateral group of arginine, which is hydrophilic, is characterized by the guanidine group which gives a considerable basicity to the amino acid.

Arginine is a chiral molecule and the laevorotatory enantiomer thereof (L-arginine) is one of the 20 ordinary amino acids which combined with each other in different ways form all proteins.

Furthermore, Arginine is considered to be an essential amino acid in infants, that is to say, it has to be introduced from outside by nutrition, because the human body is not capable of synthesizing it in sufficient quantities for the individual requirements.

Arginine, where applicable in combination with other amino acids, such as, for example, ornithine, is commonly used as a substance which is capable of promoting vasodilation, increasing the blood flow and the transport of nutrients to the muscles, with a resultant development of the muscle mass and strength.

Furthermore, arginine is also considered to be a compound which stimulates the production of growth hormone (GH), with a resultant effect on the increase of the muscle mass.

Owing to these characteristics, arginine is highly appreciated and used in sport sector, where it is often consumed by the athletes as a food supplement in the form of capsules or tablets.

Studies concerning the real efficacy of arginine consumed orally and the action mechanism thereof on the human organism are conflicting, but it has been found that arginine is a powerful insulinogenic amino acid and that the insulin itself promotes the action of vasodilation and introduction of nutrients to the muscle masses.

As set out above, the consumption of arginine is generally carried out orally, but this type of consumption has relevant disadvantages.

A first disadvantage involves the low resistance of arginine at the gastric level, where, as a result of the pH levels which are extremely low, the arginine tends to dissociate. The fraction of arginine which overcomes the gastric tract and is thus available for absorption in the organism is very limited, so that it becomes necessary to consume a very high quantity of arginine.

However, arginine when consumed in high doses can be the cause of undesirable disorders both at gastric level and at the level of the intestines. In order to improve the bioavailability of the arginine consumed orally, and therefore to improve the efficacy of the Arginine in terms of increasing the muscle mass and strength, it is also known to consume arginine in the form of arginine alpha ketoglutarate (AAKG). This arginine salt which is formed by two arginine molecules which are bonded to a molecule of alpha ketoglutarate is considered to be more effective in making the arginine bioavailable.

However, the resistance of this composition to the gastric tract is not satisfactory, so that it remains highly desirable to provide a product which is based on arginine and which is capable of providing a high level of bioavailability.

A second disadvantage involves the unpleasant taste of arginine which makes the consumption thereof via the oral route very disagreeable for the user and which, consequently, limits the possibility of providing arginine only in some pharmaceutical forms.

This disadvantage is also present when arginine is present in the arginine alpha ketoglutarate form.

In the context of the present description and the appended claims, the term "saturated" fatty acid is intended to be understood to indicate a fatty acid having a level of saturation of at least 99%.

Fatty acids having a number n of carbon atoms are indicated for short using the notation Cn.

The term "arginine" is intended to be understood to generically indicate both the stereo-isomers of Arginine even if it is particularly preferable to use the laevorotatory enantiomer (L-arginine).

STATEMENT OF INVENTION

The problem addressed by the present invention is to provide a product based on arginine or the derivatives thereof which is structurally and functionally configured to at least partially overcome the disadvantages set out above with reference to the cited prior art.

This problem is solved by the present invention by means of a product which is based on arginine and which is produced according to the appended claims. In a first aspect the invention is directed towards a granular product comprising:
  an internal core in which the arginine or the derivative thereof is substantially concentrated and
  a coating which surrounds the internal core for covering and protecting the internal core, wherein the coating is formed by a lipidic matrix.

Preferably, the lipidic matrix comprises a fraction by weight of at least 60% of the weight of the lipidic matrix of glycerides of saturated fatty acids with 16 and 18 carbon atoms (for short, C16 and C18).

Preferably, the lipidic matrix comprises a fraction by weight of a mineral salt of alginate between 0.5% and 3%.

As a result of these characteristics, the external coating effectively protects the internal core during the passage through the gastric tract and is degraded during the intestinal digestive phase, gradually releasing the arginine contained therein.

In particular, an important protection function at the gastric level is performed by the alginate salt which reacts with the hydrochloric acid which is present in the stomach, forming an insoluble gel which makes the granular product even more resistant.

Furthermore, the lipidic coating which surrounds the arginine prevents the contact thereof with the organs of taste, preventing the user from perceiving the very unpleasant taste of the arginine.

In a second aspect, the invention is further directed towards a process for producing a granular product based on arginine or a derivative thereof, comprising the step of covering an internal core, in which the arginine or the derivative thereof is substantially concentrated, with a coating formed by a lipidic matrix comprising a fraction by weight greater than 60% of glycerides of saturated fatty acids C16 and C18 and a fraction by weight of a mineral salt of alginate between 0.5% and 3%.

In a third aspect, the invention is further directed towards the use of a product based on arginine or a derivative thereof according to the first aspect as a food product which is intended for human consumption.

In the context of at least one of the above-mentioned aspects, the present invention may have at least one of the additional preferred features set out below.

In a preferred embodiment, the arginine used for forming the granular product of the invention is the laevorotatory enantiomer (L-arginine). It is provided in powdered form with mean dimensions between 0.1 and 0.15 millimetres.

In another embodiment, the arginine is in the form of a salt, preferably in the form of arginine alpha ketoglutarate or arginine hydrochloride.

In a preferred embodiment of the invention, the fraction by weight of arginine or the derivative thereof in the final granular product is between 20% and 70%, more preferably between 40% and 60%, even more preferably it is equal to approximately 50%.

The lipidic matrix which forms the coating preferably comprises a fraction by weight greater than 70% of glycerides of saturated fatty acids C16 and C18 and, more preferably, this fraction by weight is greater than 75%. In an additional embodiment, this fraction by weight is greater than 80%.

As a result of these concentration levels of C16 and C18 glycerides in the coating, the degree of protection of the arginine at the gastric level and the capacity for obtaining the slow release thereof at the intestinal level is further optimized.

In a preferred embodiment, the percentage of saturated fatty acid C18 is greater than 80% with respect to the total of the fatty acids contained in the lipidic matrix.

This characteristic confers on the lipidic matrix and therefore on the coating a protective effect for the internal core and therefore for the arginine which is considerably greater than in matrixes in which other fatty acids are preponderant, such as, for example, C12, C14, C16, C20 or C22.

The fatty acids C12, C14, C20 and C22 may be present in the lipidic matrix at percentages between 0 and 2% with respect to the total of the fatty acids, while the fatty acid C16 is preferably present in the lipidic matrix at a is percentage between 5% and 20% with respect to the total of the fatty acids.

Furthermore, it is preferable for the fatty acids present in the matrix to be substantially present in the form of glycerides and not free acids. To this end, it is necessary for the percentage of free acids inside the lipidic matrix to be less than 10% and preferably less than 2%.

Preferably, the glycerides are in the form of triglycerides.

In an embodiment, a relevant portion of the lipidic matrix is formed by hydrogenated soybean oil. In particular, the hydrogenated soybean oil constitutes a fraction by weight between 60% and 90%, more preferably between 70% and 90%, for example, of approximately 80% of the lipidic matrix.

In another embodiment, a relevant portion of the lipidic matrix is formed by hydrogenated palm oil.

In an embodiment, the lipidic matrix comprises a fraction by weight of calcium stearate between 1% and 10%, preferably between 4% and 8%.

The presence of the calcium stearate in the composition confers strength and hardness on the lipidic matrix and further acts as a thickener.

In an embodiment, the lipidic matrix comprises a fraction by weight of calcium hydroxide comprised between 1% and 5%, preferably between 3% and 5%. The provision of calcium hydroxide allows a relevant increase of the resistance of the product to the highly acidic environment of the gastric tract, preventing phenomena of dissociation of the arginine. The calcium hydroxide in fact tends to react with the gastric acids, preventing them from penetrating inside the coating. Furthermore, the calcium hydroxide is capable of saponifying portions of the fatty acids which form the lipidic matrix forming an additional protection is for the product during the digestive phase.

In an embodiment, the fraction by weight of the mineral salt of alginate is between 1% and 3%. In a preferred form, this mineral salt is sodium salt.

In an embodiment, the lipidic matrix comprises a fraction by weight of a monosaccharide or a disaccharide between 1% and 10%, preferably between 4% and 8%. In a preferred form, this monosaccharide or disaccharide is trehalose.

The monosaccharide or disaccharide forms a polymer structure which assists the structural and stabilizing action of the sodium alginate. In particular, the trehalose carries out a protective action of the arginine, increasing the resistance of the arginine to temperature and pH and preventing the arginine from degrading.

In an embodiment, the lipidic matrix comprises a fraction by weight of propylene glycol distearate comprised between 0.1% and 5%, preferably between 1% and 5% and even more preferably between 2% and 4%.

The propylene glycol distearate acts as an emulsifying agent so as to allow the complete homogenization of the lipophilic component of the lipidic matrix which is formed substantially by the glycerides of the fatty acids and by the calcium stearate, with the hydrophilic component of the lipidic matrix, formed by the calcium hydroxide, the alginate salt and the monosaccharide or disaccharide.

In an embodiment, the lipidic matrix may further comprise a fraction by weight of flavourings and/or sweeteners between 0.1% and 1%.

The uniformity of the admixture which composes the lipidic matrix is a very important characteristic in order to obtain a coating which is provided with a high resistance to gastric acids.

In a preferred embodiment, the lipidic matrix is such that it has a melting temperature between 60° C. and 75° C.

The final granular product may have any suitable shape and dimensions, but it is preferable for it to have dimensions between 0.15 and 2 millimetres. In a more preferred version, at least 80% of the product has a grain size dimension less than 0.8 mm.

The granular product of the present invention is advantageously brought about by means of a micro-encapsulation process by means of a spray cooling technique.

The lipidic matrix provided in the above-indicated proportions is first caused to melt and maintained under stirring at a suitable temperature, for example, of approximately from 70° C. to 75° C. In the molten well homogenised admixture, there is therefore added a suitable quantity of arginine in powdered form having the preferred dimensions indicated above.

The arginine which remains in solid form at the above-mentioned temperature is uniformly dispersed in the molten admixture by means of adequate mixing for a time of approximately from 5 to 20 minutes.

The dispersion obtained in this manner is therefore immediately injected at high pressure and by means of suitably shaped nozzles inside a spray cool chamber, in which the temperature is maintained between −2° C. and −12° C., in accordance with methods known per se (spray cooling technology). In this manner, there are sprayed in the cool chamber small drops of molten matrix containing the solid particles of arginine and, in the short dwell time in which the admixture particles dwell in the air, takes place the solidification of the lipidic matrix around the solid particles of arginine.

There is thereby obtained a granular product which is solid and comprises an internal core which is formed by the solid particles of arginine, and a coating for covering and protecting the internal core the coating being formed by the lipidic matrix.

After the spraying, the product is collected on conveyor belts and, when it is still inside the cool chamber, it is subjected to forced ventilation so as to be discharged from the cool chamber at a temperature less than 25° C.

In order to prevent packing phenomena of the granular product, the granular product may be sprinkled with an anti-packing agent, for example, silica powder.

The dimensions of the granules are a function of the supply pressure in the spraying chamber and the shape of the nozzles, but, if necessary, the product may be subjected to a sieving action in order to make it comply with specific desired dimensions.

As a result of the specific production process and the matrix used, the coating obtained is provided in a continuous and uniform manner around the internal core of arginine.

The product which is thereby micro-encapsulated can be used in the production of food products, which are particularly intended for human nutrition and which are directed towards introducing a suitable quantity of arginine into the organism.

In particular, the granular product of the present invention may be consumed orally in the form of capsules (in which the granular product is contained inside an operculum) or tablets or per se inside sachets.

Furthermore, the granular product according to the invention may be used as an additive or as an ingredient for other food products, for example, inside energy bars or protein bars, or in yoghurt.

The granular product according to the invention is particularly suitable for consumption orally by athletes who require an increase in strength and/or muscle mass, but may similarly be used in any other case in which the consumption of arginine may be advantageous or necessary.

EXAMPLE

In a liner type mixer, heated to the temperature of 70° C.-75° C., there are successively introduced:
393 g of hydrogenated soybean oil,
15 g of propylene glycol distearate,
500 g of powdered L-arginine,
30 g of calcium stearate,
30 g of trehalose,
20 g of calcium hydroxide,
10 g of sodium alginate,
2 g of flavourings and sweeteners.

The hydrogenated soybean oil used is formed by glycerides of fatty acids present at the percentages below:
C12: 0-0.5%,
C14: 0-1%,
C16: 9-16%,
C18: 79-90%.

The admixture is maintained under agitation for approximately 10 minutes in order to obtain a homogeneous suspension which is then supplied to a cool chamber which is maintained at a temperature of approximately −10° C. In the cool chamber the admixture has been sprayed using a nozzle which is suitable for the desired grain size so as to obtain granules with an internal core which is based on arginine and which is coated with a lipidic matrix.

The granular product which is removed from the cool chamber is finally subjected to sieving in order to suitably delimit the dimensions of the finished product.

The invention claimed is:

1. A granular product based on arginine or the derivatives thereof, comprising an internal core in which there is substantially concentrated the arginine or the derivatives thereof and a coating for covering and protecting the internal core, wherein the coating is formed by a lipidic matrix comprising a fraction by weight equal to or greater than 60% of glycerides of saturated fatty acids C16 and C18 and a fraction by weight of calcium stearate comprised between 1% and 10%.

2. The granular product according to claim 1, wherein the lipidic matrix comprises a fraction by weight greater than 70% of glycerides of saturated fatty acids C16 and C18.

3. The granular product according to claim 1 wherein the lipidic matrix comprises a fraction by weight of fatty acid C18 equal to or greater than 80% with respect to the total of the fatty acids contained in the lipidic matrix.

4. The granular product according to claim 1, wherein the lipidic matrix comprises a fraction by weight of calcium stearate comprised between 4% and 8%.

5. The granular product according to claim 1, wherein the lipidic matrix comprises a fraction by weight of calcium hydroxide comprised between 1% and 5%.

6. The granular product according to claim 1, wherein the lipidic matrix comprises a fraction by weight of a monosaccharide or a disaccharide comprised between 1% and 10%.

7. The granular product according to claim 6, wherein the monosaccharide or disaccharide is trehalose.

8. The granular product according to claim 1, wherein the lipidic matrix comprises a fraction by weight of propylene glycol distearate comprised between 0.1% and 5%.

9. The granular product according to claim 1, wherein the glycerides are in the form of triglycerides, with a free acidity less than 2%.

10. A method for administering arginine, the method comprising: incorporating the granular product based on arginine or the derivatives thereof according to claim 1 into capsules, tablets, or as an ingredient of a food product; and a human consuming at least one of the capsules, the tablets, or the food product.

11. The granular product according to claim 1, wherein the lipidic matrix comprises a fraction by weight of a mineral salt of alginate comprised between 0.5% and 3%.

* * * * *